US005802556A

United States Patent [19]

Patel et al.

[11] Patent Number: 5,802,556

[45] Date of Patent: Sep. 1, 1998

[54] METHOD AND APPARATUS FOR CORRECTING MISALIGNED INSTRUCTION DATA

[75] Inventors: Rajesh Bhikhubhai Patel; Soummya Mallick, both of Austin, Tex.

[73] Assignee: International Business Machines Corporation, Armonk, N.Y.

[21] Appl. No.: 680,808

[22] Filed: Jul. 16, 1996

[51] Int. Cl.[6] .................... G06F 9/315

[52] U.S. Cl. .................... 711/109; 395/800.23

[58] Field of Search .................... 711/109; 395/800.23

[56] References Cited

U.S. PATENT DOCUMENTS

| | | | |
|---|---|---|---|
| 5,497,493 | 3/1996 | Colwell | 395/800.23 |
| 5,560,032 | 9/1996 | Nguyen | 395/800.23 |
| 5,577,200 | 11/1996 | Abramson | 395/185.03 |
| 5,615,385 | 3/1997 | Fetterman | 395/800.23 |
| 5,630,149 | 5/1997 | Bluhm | 395/393 |
| 5,655,097 | 8/1997 | Witt | 395/380 |

*Primary Examiner*—Eric Coleman
*Attorney, Agent, or Firm*—Liddell, Sapp, Zivley, Hill & LaBoon, L.L.P.

[57] ABSTRACT

In a microprocessor having a plurality of execution units, rename register, architectural registers, and a cache for storing blocks of data, each block having a plurality of words, a method for aligning bytes stored in separate words. In one version, the method includes the steps of reading a first word of data from the cache; rotating the first word to align a first byte with respect to a first byte of a rename register; storing the first aligned byte in the rename register; reading a second word from the cache; rotating the second word to align a second byte with respect to a second byte of the rename register; and storing the second aligned byte in the rename register.

12 Claims, 2 Drawing Sheets

METHOD AND APPARATUS FOR CORRECTING MISALIGNED INSTRUCTION DATA

TECHNICAL FIELD

The present invention generally relates to the field of microprocessors and more particularly, relates to a method and apparatus for correcting misaligned instruction data in superscaler processors.

BACKGROUND OF THE INVENTION

Current microprocessors typically employ cache memory to improve the operating performance of the microprocessor. Both data and instructions are cached in many modem microprocessor designs. Such caching techniques are well known in the art. See e.g., Mike Johnson "Superscaler Microprocessor Design," Prentice Hall (1991), incorporated herein by reference.

Caching techniques are especially important to the performance of superscaler microprocessors because superscaler processors are designed to fetch and execute more than one instruction per cycle. However, one problem frequently encountered in cached superscaler processor designs is data misalignment.

Cache memory is generally arranged in blocks, or lines, consisting of several bytes of memory. For example, in the exemplary IBM "POWERPC" architecture each cache block consists of two words, each word consisting of four bytes, for a total of 8 bytes per block. Each word of each block is individually addressable.

FIG. 1 shows an example of a cache 100 which is n bytes wide. The cache 100 includes blocks 0 and 1, each consisting of words 0 and 1. Word 0 of block 0 consists of bytes 0–3, word 1 consists of bytes 4–7, word 0 of block 1 consists of bytes 8–B, and word 1 consists of bytes C–F.

The execution of certain instructions can cause data in the cache to be misaligned as will be described with respect to FIG. 1. For example, on the execution of a load word instruction, address data from two general purpose registers ("GPRs") is added, and data is retrieved from the cache at the resulting address and stored into a third general purpose register. To illustrate how such an instruction can cause data in the cache to become misaligned, it is assumed that the load word instruction at issue requires two addresses stored in GPR 1 and GPR 2, respectively, to be summed and the data from the cache at the resulting address to be stored in GPR 3. If GPR 1 equals 0, and GPR 2 equals 1, then the word beginning at address 1 in block 0 of cache 100 will be written in GPR 3. As shown in FIG. 1, this word comprises bytes 1–4 which are stored partly in word 0 and partly in word 1. Thus, to store this word in GPR 3, two reads from cache 100 are required. In the first read, bytes 0–3 are retrieved from word 0. In the second read, bytes 4–7 are retrieved from word 1. This data is then merged to form a single word comprising bytes 1–4, and stored in GPR 3. Of course, to properly merge the desired data from words 0 and 1, the relevant bytes must be aligned.

FIG. 2 shows an example of a conventional alignment circuit. Referring to the example above, the first read, bytes 0–3 are read from block 0, word 0 of cache 100 and passed to byte rotator 300. Byte rotator 300 shifts the word read from the cache one byte to the left and stores the result in register 302. Register 302 is one word wide and, after receiving data from byte rotator 300, contains bytes 123x, in that order, where "x" indicates a don't care condition. On the following read, bytes 4–7 are read from block 0 word 1 of the cache and passed to byte rotator 300 which rotates bytes 4–7 three bytes to the right so that the output of byte rotator 300 comprises bytes xxx4, in that order.

The 32-bit output busses from byte rotator 300 and register 302 are subdivided into byte wide data busses and provided to multiplexers 304, 306, 308 and 310 as shown. Multiplexers 304–310 are conventional 2:1 multiplexers each having inputs a and b. The output of each of the multiplexers is coupled to a one byte wide segment of 32-bit data bus, 312 through tri-state buffers 305, 307, 309 and 311. Data bus 312 is coupled to rename register block 314 comprising rename registers R0–Rn.

After the second read as described in the above example, it will be clear from FIG. 3 that to merge the desired data, and store a properly aligned word in one of registers R0–Rn, it is necessary only to activate multiplexer select lines **304*b*, 306*b* and 308*b* of multiplexers 304, 306 and 308, respectively, and select line 310*a* of multiplexer 310. The multiplexer outputs are then provided to, for example, rename register R0 which would store the properly ordered word consisting of bytes 1, 2, 3, and 4. The aligned word stored in register R0** can now be passed to any desired execution unit of the processor, or written back to memory on the general purpose registers.

One problem with the technique described above is that the circuitry required, particularly the alignment storage registers such as register 302, require a great deal of silicon area for fabrication. This problem is compounded when the implementation allows parallel misaligned loads to occur causing the amount of alignment hardware and alignment registers to be increased. Therefore, these alignment registers will be duplicated numerous times on the chip.

It is, therefore, an object of the present invention to overcome the above problems in the art as well as to provide further improvements and advantages which will become apparent in view of the following disclosure.

SUMMARY OF THE INVENTION

One aspect of the invention relates to a method useful in a microprocessor having a plurality of execution units, rename registers, architectural registers and a cache for storing blocks of data, each cache block having a plurality of words, for aligning data bytes stored in separate words. In one embodiment, the method comprises the steps of reading a first word from the cache; rotating the first word to align at least one byte of the first word with a first byte of a rename register; storing the at least one byte of the first word in the rename register; reading a second word from the cache; rotating the second word to align at least one byte of the second word with a second byte of the rename register; and storing the at least one byte of the second word in the rename register.

Another aspect of the invention relates to a circuit for aligning bytes stored in separate words of a microprocessor cache. In one embodiment, the circuit comprises means for reading a first word from the cache; means for rotating the first word to align at least one byte of the first word with a first byte of a rename register; means for storing the at least one byte of the first word in the rename register; means for reading a second word from cache; means for rotating the second word to align at least one byte of the second word with a second byte of the rename register; and means for storing the at least one byte of the second word in the rename register.

DETAILED DESCRIPTION OF EMBODIMENTS OF THE INVENTION

Figure 1:
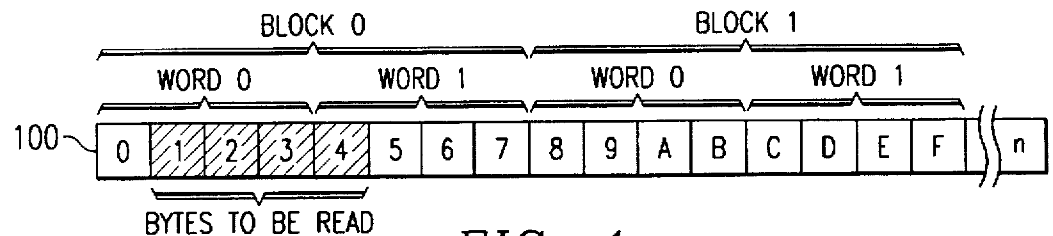
FIG. 1 is a block diagram of a conventional cache memory.
Figure 2:
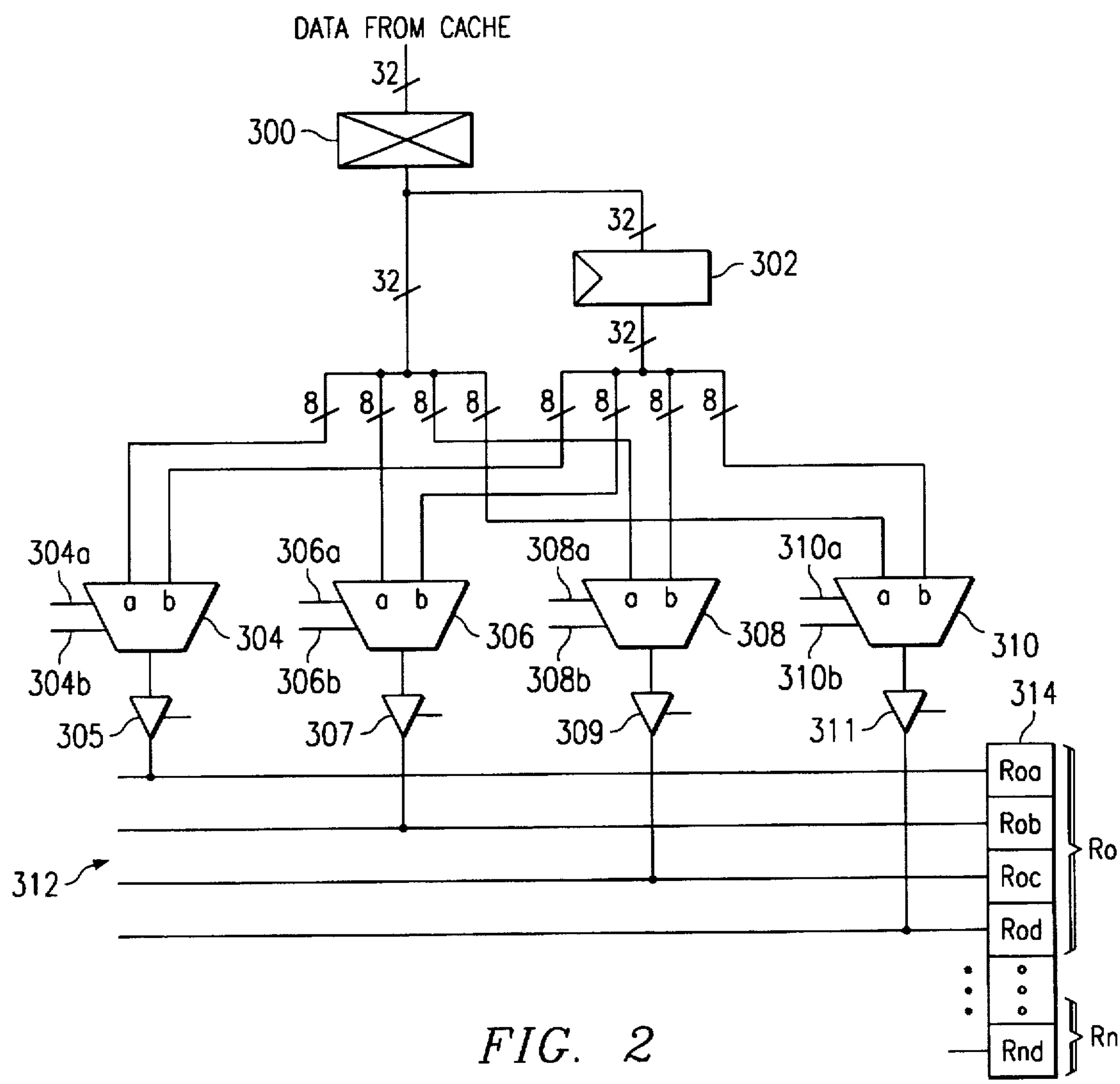
FIG. 2 is a schematic diagram of a conventional aligning circuit.
Figure 3:
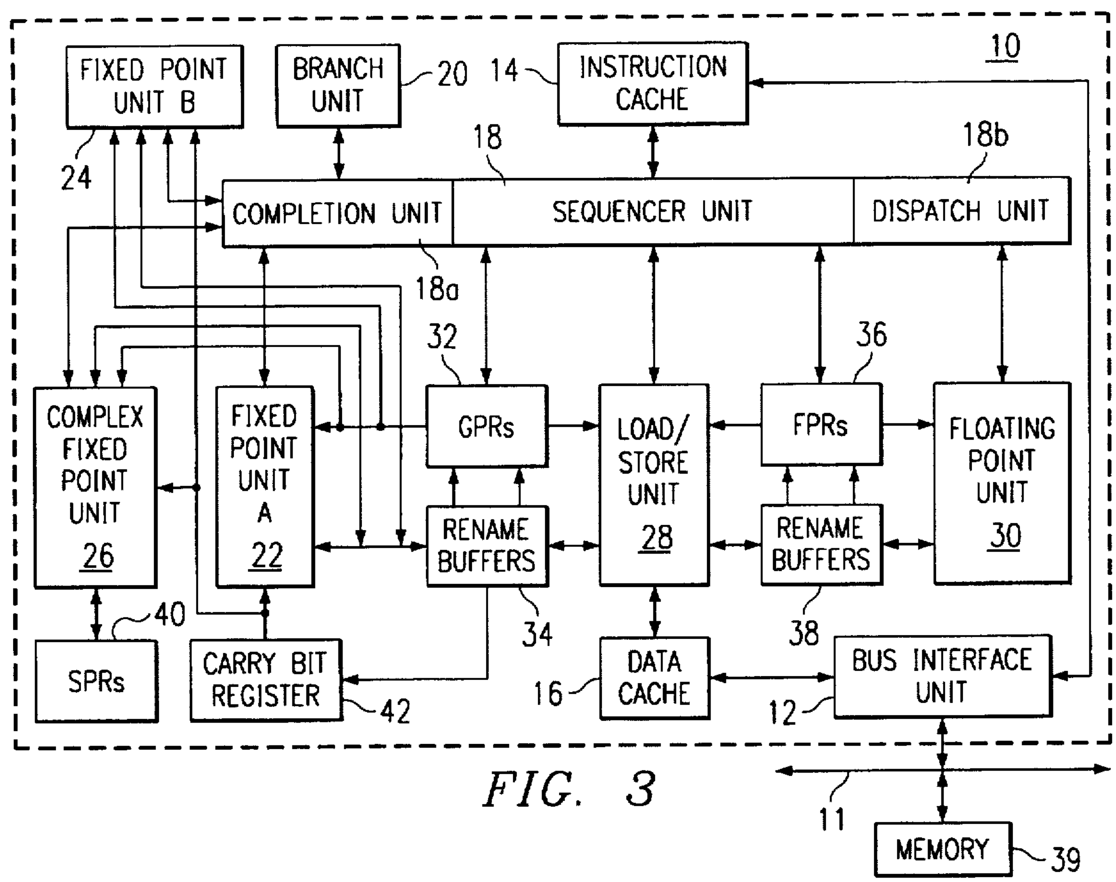
FIG. 3 is a block diagram of a processing unit comprising an alignment circuit according to an embodiment of the invention.

FIG. 3 is a block diagram of a processor 10 system for processing information according to an embodiment of the invention. In this embodiment, processor 10 is a single integrated circuit superscaler microprocessor. Accordingly, as discussed further hereinbelow, processor 10 includes various units, registers, buffers, memories, and other sections, all of which are formed by integrated circuitry. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating-point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating-point architectural registers ("FPRs") 36 and floating-point rename buffers 38. FPU 30 outputs results (destination operand information) of its operation for storage at selected entries in floating-point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 includes completion unit **18*a* and dispatch unit 18*b*. The dispatch unit 18*b*** provides the logic for decoding instructions and issuing them to the appropriate execution units. A reorder buffer entry is allocated for each instruction, and dependency checking is done between the instructions in a dispatch queue. The rename buffers are searched for the operands as the operands are fetched from the register file. Operands that are written by other instructions ahead of the one in the dispatch queue are given the tag of that instruction's rename buffer; otherwise, the rename buffer or register file supplies either the operand or a tag. As instructions are dispatched, a fetch unit is notified that the dispatch queue can be updated with more instructions.

Completion unit **18*a*** retires executed instructions from the reorder buffer and recognizes exception conditions and discards any operations being performed on subsequent instructions in program order. The instruction is retired from the reorder buffer when it has finished execution and all instructions ahead of it have been completed. The instruction's result is written into the appropriate register file and is removed from the rename buffers at, or after completion. At completion, other resources affected by this instruction are updated.

When dispatch unit **18*b* dispatches an instruction to an execution unit, the instruction, along with tags representing the instruction number, the target rename buffer, and the operand source, is simultaneously dispatched to the completion unit 18*a*. The completion unit 18*a* maintains the order in which the instructions are dispatched in a first-in first-out ("FIFO") buffer. Completion unit 18*a* monitors the valid bits associated with the rename registers. When an execution unit sets a valid bit of a rename register to indicate that the rename register contains valid information, the corresponding instruction in the FIFO buffer of the completion unit is marked as finished. If there are no unfinished instructions ahead of the finished instruction in the FIFO buffer, then the completion unit 18*a* writes the result of the finished instruction back to the architectural registers. If there are unfinished instructions ahead of the finished instruction, then the completion unit 18*a*** waits until they are also finished before writeback to the architectural registers is performed. This prevents writing erroneous data to the architectural registers if one of the unfinished instruction results in an exception.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating-point operations on source operands, such as floating-point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining" as discussed previously. An instruction is normally processed as six stages, namely fetch, decode, dispatch, execute, completion, and "writeback".

In the fetch stage, sequencer unit 18 selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28 and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

Figure 4:
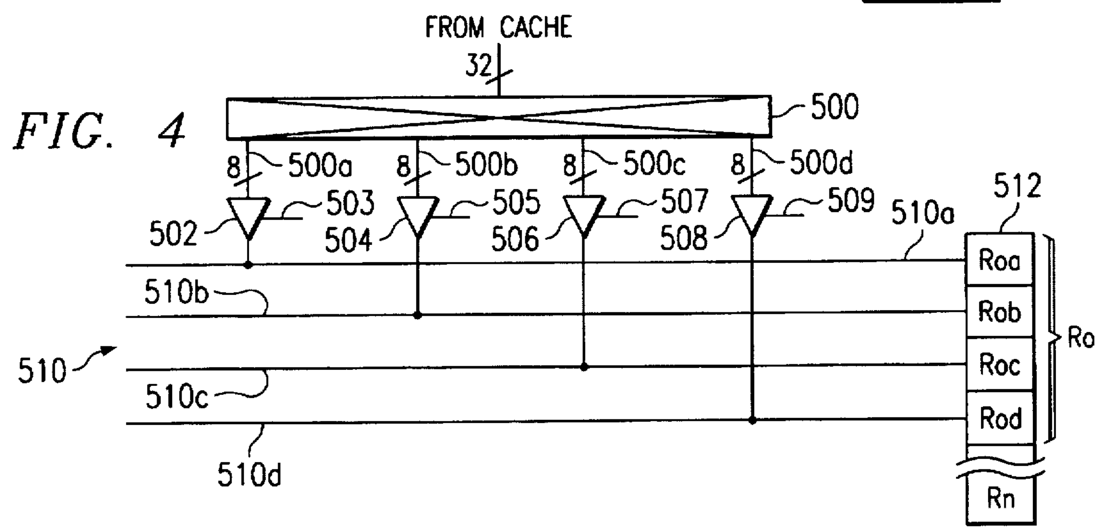
FIG. 4 is a schematic diagram of a circuit for providing data alignment according to an embodiment of the invention.

FIG. 4 is a schematic diagram according to an embodiment of the invention in which misaligned data is written directly to the rename registers. To eliminate the alignment registers, the rename register associated with the particular instruction ID is used to provide the temporary storage for data from the first read of the data cache 200. In this embodiment, a word is provided to byte rotator 500 from the cache. Byte rotator 500 is adapted to rotate the bytes in the word supplied from the cache and output this data on four 8-bit data lines 500*a*–500*d*. Each of these data lines is coupled to data bus 510 which passes data to rename register block 512.

Data bus 510 comprises four 8-bit data lines 510*a*–510*d*. Each of the output data lines 500*a*–500*d* from byte rotator 500 is coupled to a corresponding 8-bit data line 510*a*–510*d* via tri-state buffers 502, 504, 506 and 508 as shown. The tri-state buffers are operated by select lines 503, 505, 507 and 509, respectively.

Rename register block 512 comprises n rename registers R0–Rn. Each rename register is one word wide and is byte addressable. For instance, rename register R0 comprises four bytes R0*a*–R0*d*, each of which is accessible by a corresponding 8-bit data line 510*a*–510*d* of data bus 510. For purposes of illustration, data bus 510 is shown being coupled directly to rename register R0. However, it is to be understood that in practice, data bus 510 is multiplexed into each of registers R0–Rn so that byte rotator 500 can pass data to any byte of any register in the rename register block 512.

Figure 5:
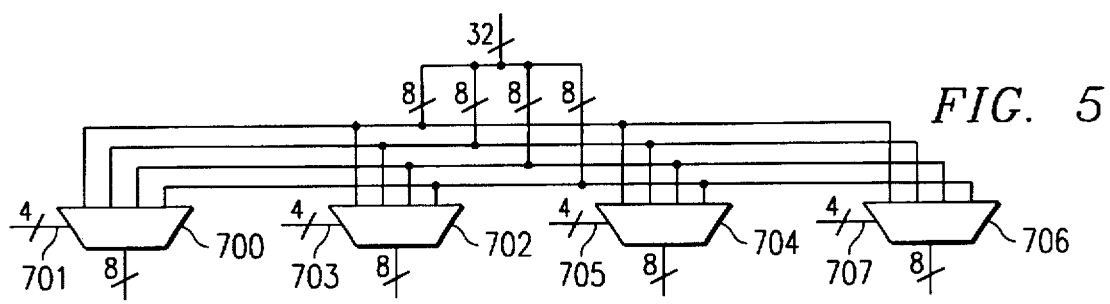
FIG. 5 is a circuit of a byte rotator useful in the embodiment of the invention shown in FIG. 4.

Byte rotator 500 is adapted to align any byte of the word received from the cache with any of the 8-bit output data lines 500*a*–500*d* and, hence, with any byte R0*a*–R0*d* of rename register R0. An example of a suitable byte rotator is shown in FIG. 5. In this case, the 32-bit data line coming from the cache is ripped into four 8-bit data lines, each of which is provided as a separate input into multiplexers 700, 702, 704 and 706. The operation of each of the multiplexers is controlled by select lines 701, 703, 705 and 707, respectively. As is clear from the figure, any byte of any word passed on the 32-bit data line may be output by any of the multiplexers 700, 702, 704 and 706 by activation of the appropriate select lines of the corresponding mutiplexer. Thus, although the term rotator is used, it is to be understood that, in some embodiments, rotating the bytes refers to operations more complex than simply shifting the bytes right or left because the bytes may be placed in any order as a matter of design choice.

In operation, the embodiment of FIG. 4 allows any byte of the word received from the cache to be rotated and stored in any byte of any of the rename registers in rename register block 512 by selectively operating tri-state buffers 502, 504, 506 and 508. This is described in greater detail with respect to the following example. Referring again to FIG. 1, it is assumed that bytes 1–4 are to be read from cache 100, aligned, and stored in bytes R0*a*–R0*d*, respectively, of rename register R0. On the first read, word 0 from cache block 0, comprising bytes 0–3, is passed to byte rotator 500. Byte rotator 500 rotates this data one byte to the left so that bytes 1, 2 and 3 are aligned with output data lines 500*a*, 500*b*, and 500*c*, respectively. Bytes 1, 2 and 3 are then passed to R0*a*, R0*b* and R0*c* through tri-state buffers 502, 504 and 506. Tri-state buffer 508 is placed in high impedance mode so that byte R0*d* is not written at this time.

On the second read, word 1 of cache block 0, consisting of bytes 4–7, is passed to byte rotator 500. Byte rotator 500 rotates this data three bytes to the right so that byte 4 is aligned with output line 500*d*. This data is then written into R0*d*, by activating tri-state buffer 508. While byte R0*d* is being written, tri-state buffers 502, 504 and 506 are set to remain in high impedance mode so that the data in bytes R0a–R0c is not overwritten. Thus, at the end of the second read, it is seen that bytes 1, 2, 3 and 4 are properly aligned, and stored in bytes R0a–R0d, respectively, of rename register R0. This aligned data may then be accessed by other execution units of the processor or written back to the architectural registers. A similar operation is performed when the bytes to be read from the cache span two separate cache blocks. For example, if the word consisting of bytes 6–9 is to be aligned, then on the first read, word 1 of block 0 is read and rotated two bytes to the left. Bytes 6 and 7 are then stored in R0a–R0b, respectively. On the second read, word 0 of cache block 1 is read and rotated two bytes to the right so that bytes 8 and 9 are aligned, then written to R0c and R0d, respectively.

It will be obvious to those of skill in the art that the invention is no way limited to 32-bit systems. It is well within the ability of one of skill in the art to adapt the specific embodiments described above to processors having cache blocks and rename registers of any desired size. It is also believed within the ability of one skilled in the art to apply the present invention to processors in which the data is aligned on different memory boundaries such as nibbles or words. Further, it will be clear to those skilled in the art that, although the present invention has been described in detail with respect to embodiments in which a word consists of four bytes, the term word is in no way so limited and can consist of any number of bytes depending on the terminology chosen, for example, a word is also defined as two bytes in other commonly used architectures.

All patents, patent applications, and other publications referenced herein are hereby incorporated by reference as though set forth in full. Although the invention has been particularly shown and described with reference to specific embodiments, it will be understood by those skilled in the art that various changes in form and detail may be made therein without departing from the spirit and scope of the invention.

What is claimed is:

1. In a microprocessor having a plurality of execution units, rename registers, architectural registers and a cache for storing blocks of data, each block having a plurality of words, a method for aligning bytes stored in separate words, the method comprising:

- reading a first word from the cache;
- rotating the first word to align at least one byte of the first word with a first byte of a rename register;
- storing the at least one byte of the first word in the rename register;
- reading a second word from the cache;
- rotating the second word to align at least one byte of the second word with a second byte of the rename register;
- storing the at least one byte of the second word in the rename register.

2. A method as in claim 1 further comprising writing back the bytes stored in the rename register into an architectural register.

3. A method as in claim 1 further comprising providing the bytes stored in the rename register to an execution unit.

4. A method as in claim 1 wherein rotating the first word comprises placing the at least one byte of the first word on a data bus coupled to the first byte of the rename register.

5. A method as in claim 1 wherein rotating the second word comprises placing the at least one byte of the second word on a data bus coupled to the second byte of the rename register.

6. A method as in claim 1 wherein storing the at least one byte of the first word in the rename register comprises writing it into the register through a tri-state buffer.

7. A method as in claim 1 wherein storing the at least one byte of the second word in the rename register comprises writing it into the register through a tri-state buffer.

8. In a microprocessor having a plurality of execution units, rename registers, architectural registers, and a cache for storing blocks of data, each block having a plurality of words, a circuit for aligning bytes stored in separate words, the circuit comprising:

- means for reading a first word from the cache;
- means for rotating the first word to align at least one byte of the first word with a first byte of a rename register;
- means for storing the at least one byte of the first word in the rename register;
- means for reading a second word from the cache;
- means for rotating the second word to align at least one byte of the second word with a second byte of the rename register;
- means for storing the at least one byte of the second word in the rename register.

9. A circuit as in claim 8 wherein the means for rotating the first word comprises a byte rotator which provides the at least one byte of the first word to a data bus coupled to the first byte of the rename register.

10. A circuit as in claim 8 wherein the means for rotating the second word comprises a byte rotator which provides the at least one byte of the second word to a data bus coupled to the second byte of the rename register.

11. A circuit as in claim 9 wherein the means for storing the at least one byte of the first word in the rename register comprises a data bus coupled between the byte rotator and the rename register through a tri-state buffer.

12. A circuit as in claim 10 wherein the means for storing the at least one byte of the second word in the rename register comprises a data bus coupled between the byte rotator and the rename register through a tri-state buffer.

* * * * *